United States Patent
Budd et al.

(10) Patent No.: US 10,557,301 B2
(45) Date of Patent: Feb. 11, 2020

(54) AUTOMATED DOOR SYSTEM

(71) Applicant: PIERO LLC, Provo, UT (US)

(72) Inventors: Riley Shea Budd, Provo, UT (US); Morgen Lee Glessing, Woodland, WA (US); Connor McLeod, Stokesdale, NC (US); Joshua Steven Horne, Provo, UT (US); Samuel Jr-Yung Lew, Provo, UT (US); Jacob Karl Parry, Bountiful, UT (US)

(73) Assignee: PORTAL ENTRYWAYS, INC, Provo, UT (US)

( * ) Notice: Subject to any disclaimer, the term of this patent is extended or adjusted under 35 U.S.C. 154(b) by 0 days.

(21) Appl. No.: 16/038,033

(22) Filed: Jul. 17, 2018

(65) Prior Publication Data
US 2019/0024438 A1 Jan. 24, 2019

Related U.S. Application Data

(60) Provisional application No. 62/534,097, filed on Jul. 18, 2017.

(51) Int. Cl.
*E05F 15/77* (2015.01)
*G07C 9/00* (2006.01)
*H04W 4/80* (2018.01)

(52) U.S. Cl.
CPC .......... *E05F 15/77* (2015.01); *G07C 9/00007* (2013.01); *G07C 2009/00793* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 6,956,495 B2 | 10/2005 | Klein et al. | |
| 7,167,076 B2 * | 1/2007 | Wilson | G07C 9/00182 307/114 |
| 7,545,833 B2 | 6/2009 | Chau et al. | |
| 7,719,213 B2 | 5/2010 | Herman | |
| 9,483,887 B1 | 11/2016 | Soleimani | |
| 9,858,739 B1 * | 1/2018 | Johnson | H04W 76/10 |
| 2013/0298208 A1 | 11/2013 | Ayed | |

(Continued)

OTHER PUBLICATIONS

EMX, Industries, Inc., BlueGuard FE, Bluetooth Enabled Access Control, Operating Instructions, Introduced May 2009, Documnet No. 10100104, pp. 1-8.

*Primary Examiner* — Carlos Garcia
(74) *Attorney, Agent, or Firm* — Snell & Wilmer L.L.P.

(57) ABSTRACT

An automated door system includes a first door control module configured to be mounted in a fixed position relative to a powered door and a second door control module configured to be carried by a user and configured to be in electronic communication with the first door control module to control at least one of an opening actuation and a closing actuation of the powered door. A method of controlling the powered door may include wirelessly electronically connecting a second door control module to a first door control module, determining a proximity of the second door control module to the first door control module, an automating the opening and closing of the powered door in response to a position of the second door control module relative to the first door control module.

20 Claims, 4 Drawing Sheets

(56) References Cited

U.S. PATENT DOCUMENTS

2014/0340193 A1* 11/2014 Zivkovic ............. G07C 9/00111
340/5.61
2015/0339869 A1    11/2015 Szymke et al.
2017/0084102 A1     3/2017 Szymke et al.

* cited by examiner

AUTOMATED DOOR SYSTEM

CROSS-REFERENCE TO RELATED APPLICATION

This application claims the benefit of U.S. Provisional Application No. 62/534,097, filed Jul. 18, 2017 entitled "AUTOMATED DOOR SYSTEM," which is incorporated herein by reference in its entity for all purposes.

FIELD

The present disclosure relates to powered door assemblies, and more specifically to activating and/or controlling powered door assemblies.

BACKGROUND

Currently the best method for a wheelchair user to enter an accessible entry is to approach and push a handicap-labeled button, which causes a powered door to open. However, there are various shortcomings pertaining to this conventional system. For example, some users may have conditions that affect their entire body, such as muscular dystrophy or cerebral palsy, and these users may not possess the physical strength or ability to push the buttons. Further, handicap-labeled buttons are often positioned in awkward or out-of-the-way locations, thus making it difficult for certain users to use the entry. Such a situation may be especially problematic for schools (primary, intermediate, advanced), libraries, hospitals, malls, businesses, etc.

The shortcomings of conventional entryways are not just affecting users with disabilities. For example, stroller users, users carrying or pushing large loads (e.g., caterers, janitors, etc.), and/or elderly users have many significant unmet needs regarding the conventional, button-activated door opening systems. Further, such doors may open too slowly and/or may close too quickly. Still further, many conventional door systems fall into disrepair, thus leaving the respective entry inaccessible and thus potentially exposing the owner of the property liability under various safety and accessibility standards, For example, failure to maintain an operable entry may go against standards of the American National Standards Institute (ANSI) or the Builders Hardware Manufacturers Association (BHMA), among others. Further, an entryway in disrepair may lead to liability under the American with Disabilities Act (ADA) for failure to comply with relevant ADA standards.

SUMMARY

In various embodiments, the present disclosure provides an automated door system that includes a first door control module configured to be mounted in a fixed position relative to a powered door and a second door control module configured to be carried by a user and configured to be in electronic communication with the first door control module to control at least one of an opening actuation and a closing actuation of the powered door.

The first door control module may be configured to be wirelessly connected to the second door control module via a Bluetooth Low Energy network. The first door control module may comprise hardware configured to be coupled to a motor of the powered door. The hardware may be a beacon such that the hardware emits a Bluetooth Low Energy signal. Regardless of whether the first door control module or the second door control module transmits the signal, the other of the first door control module and the second door control module receives the signal and a wireless electronic connection between the two modules is made.

In various embodiments, the hardware of the first door control module includes a processor. A tangible, non-transitory memory may be configured to communicate with the processor, and the tangible, non-transitory memory having instructions stored thereon that, in response to execution by the processor, cause the automated door system to perform at least one of the opening actuation and closing actuation of the powered door. The second door control module may include an application (e.g., an "app") stored on a portable electronic device of the user that includes at least a portion of the instructions.

In various embodiments, the hardware of the first door control module is configured to define a wireless proximity region relative to the powered door. In response to the second door control module entering the wireless proximity region, the processor causes the powered door to perform the opening actuation, according to various embodiments. In response to the second door control module exiting the wireless proximity region, the processor causes the powered door to perform the closing actuation, in accordance with various embodiments.

In various embodiments, at least one of the first door control module and the second door control module is configured to be in electronic communication with a server via a mobile broadband network. The first door control module may be configured to be wirelessly connected to the second door control module via a Bluetooth Low Energy network and the second door control module may be configured to be wirelessly connected to the server via the mobile broadband network. In various embodiments, the second door control module comprises at least one of an application stored on a portable electronic device of the user, a fob, and a component integrated into a wheelchair or other accessibility device.

Also disclosed herein, according to various embodiments, is an automated door system that includes a first door control module having hardware mounted to a motor of a powered door, wherein the hardware of the first door control module comprises a processor, wherein a tangible, non-transitory memory is configured to communicate with the processor, wherein instructions are stored on the tangible, non-transitory memory. The automated door system may further include a second door control module comprising an application stored on a portable electronic device of a user, wherein the second door control module is configured to be in electronic communication with the first door control module via a short-range radio network in response to the portable electronic device being within a wireless proximity region. The application comprises at least a portion of the instructions, wherein the instructions cause the automated door system to perform, by the processor, at least one of an opening actuation and a closing actuation of the powered door, according to various embodiments.

In various embodiments, the automated door system further includes a third door control module mounted in a fixed position relative to the powered door, wherein the third door control module is coupled to a button that is depressible for manual control of at least one of the opening actuation and the closing actuation. The third door control module is in electronic communication with the first door control module via the short-range radio network, in accordance with various embodiments. The wireless proximity region may be defined by at least one of the hardware of the first door control module and the third door control module.

Also disclosed herein, according to various embodiments, is a method of controlling a powered door. The method may include wirelessly electronically connecting, by a processor of a first door control module that is mounted in a fixed position relative to the powered door, a second door control module to the first door control. The second door control module may include an application stored on a portable electronic device of a user. The method may also include determining, by the processor, a proximity of the second door control module to the first door control module. Still further, the method may include, in response to determining that the second door control module is entering a defined wireless proximity region relative to the powered door, actuating, by the processor, the powered door to open the powered door. Similarly, the method may include, in response to determining that the second door control module is exiting the defined wireless proximity region relative to the powered door, actuating, by the processor, the powered door to close the powered door. In various embodiments, "closing" the powered door may refer to actively closing the powered door with a motor or "closing" the powered door may refer to passively allowing the door to close (e.g., the door may be biased so as to be in a closed position, and the opening of the powered door and the maintaining of the powered door in an open position may include overcoming the bias using a motor or other actuation system).

In various embodiments, the method further includes determining, by at least one of the portable electronic device and the processor, at least one of a position, an orientation, and a location of the portable electronic device relative to the user. This step of determining may include receiving sensed information from at least one of an accelerometer, magnetometer, and light sensor of the portable electronic device. In various embodiments, the method further includes providing, by at least one of the portable electronic device and the processor, at least one of an audible indicator, a visible indicator, and a haptic indicator to the user pertaining to a status of the powered door. In various embodiments, the method further includes receiving, by the processor, feedback from the user via the application of the second door control module pertaining to at least one of a door status and a door condition of the powered door. Still further, the method may include transmitting, by the processor, data pertaining to operation of the powered door to a server.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

In various embodiments, an automated door system is provided herein. Generally, the automated door system is configured to automatically open and close a powered door in response to specific users' proximity to the powered door. As mentioned above in the summary section, "closing" the powered door may be an active/powered step or "closing" the powered door may be a passive step. That is, closing the powered door may refer to ceasing to hold the door open and allowing the door to close on its own (e.g., the door may be biased such that the door may close in the absence of an opening force). In various embodiments, "closing" the door may comprise actuating a relay within the actuation assembly of the powered door.

In various embodiments, the automated door system is not an automated system for opening powered doors for every person that passes through the door, but instead provides personal, hands-free opening and closing of powered doors for individual users. This automated door system enables users, such as those with disabilities, to transport themselves to different places in their daily route without relying on others for assistance to gain entrance to and exit from buildings and without necessarily requiring physical/mechanical actuation of a button, thereby increasing feelings of empowerment and independence. While specific attention and emphasis may be placed upon users with disabilities, it is expected that other types of users may benefit from the automated door system disclosed herein. For example, elderly users, parents with small children (e.g., pushing a stroller), cargo services, and injured persons, etc., may benefit from the disclosed automated door system.

Figure 1:
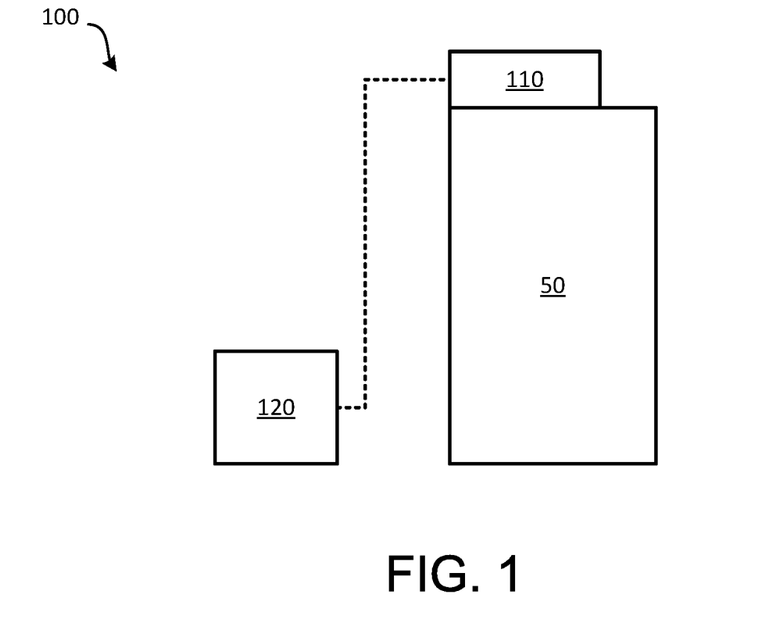
FIG. 1 is a schematic block diagram of an automated door system with a first door control module and a second door control module, in accordance with various embodiments.

In various embodiments, and with reference to FIG. 1, the automated door system 100 may include a first door control module 110 and a second door control module 120. Generally, the first door control module 110 is a fixed control unit and the second door control module 120 is a portable/movable control unit that moves with the user to interface with different first door control modules of different doors. Accordingly, the first door control module 110 may be mounted in a fixed position relative to a powered door 50 and the second door control module 120 may be carried by a user and may be configured to be in electronic communication with the first door control module 110. It is this wireless electronic connection between the first door control module 110 and the second door control module 120 that enables automated control of the powered door 50. For example, the system 100 may be configured such that the first door control module 110 causes the powered door 50 to open and close (also referred to herein as an opening actuation and closing actuation) based on the proximity of the second door control module 120 to the first door control module 110.

In various embodiments, the first door control module 110 may include hardware that controls or facilitates control of the powered door 50. The first door control module 110 may be an add-on or a retro-fit install that interfaces with an existing motor for a powered door 50, or the first door control module 110 may be integrated with a motor/actuation assembly for a powered door 50. The first door control module 110 may be a computer/controller with a processor and a tangible, non-transitory memory for storing operating various instructions thereon. The second door control module 120 may include specific/unique device, such as a fob or other electronic device specifically configured to communicate with the first door control module 110 to automate the powered doors 50. The second door control module 120 may be integrated into an accessibility device, such as a wheel chair, a crutch, a scooter, slings, boots, casts, etc. In various embodiments, the second door control module 120 may comprise an application (e.g., an "App") on a portable electronic device of a user. That is, the second door control module 120 may be a downloadable app on a smartphone, tablet, or other portable computing device. Accordingly, the app may utilize one or more of the components of the portable electronic device of the user to communicate with the first door control module 110. That is, the processor, memory, wireless communication antennas, etc., of the portable electronic device may be utilized by app in order to achieve automated door opening and closing, as described in greater detail below.

Functionality of the overall system 100 may be accomplished via computer processor execution by one or both of the first door control module 110 and the second door control module 120. That is, the control modules 110, 120 may include one or more processors and one or more tangible, non-transitory memories configured to implement digital or programmatic logic. For example, the hardware of the first door control module 110 may comprise computer-based system program instructions and/or processor instructions, which may be loaded onto a tangible, non-transitory computer readable medium having instructions stored thereon that, in response to execution by a processor, cause the processor to perform various operations, as described below with reference to FIG. 4. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found in In re Nuijten to fall outside the scope of patentable subject matter under 35 U.S.C. § 101.

In various embodiments, for example, the one or more processors of the door control modules 110, 120 may comprise one or more of an application specific integrated circuit (ASIC), digital signal processor (DSP), field programmable gate array (FPGA), general purpose processor, and/or other programmable logic device, discrete gate, transistor logic, or discrete hardware components, or any various combinations thereof and/or the like, and the one or more tangible, non-transitory memories store instructions that are implemented by the one or more processors for performing various functions, such as the systems and methods of the inventive arrangements described herein.

Users may enroll to have access to the system 100. That is, a prospective user may sign-up on a website or over the phone to have a fob or other independent electronic device sent to them for interfacing with the first door control module 110 installed on powered doors 50. The users may register their wheelchair other accessibility device having integrated components that allow it to interface with the first door control module 110. In various embodiments, anyone may become a user by downloading an app onto their portable electronic device. During operation, the first door control module 110 may check to see if the second door control module 120 is registered/enrolled in a server/cloud database before opening/closing the powered door 50.

In various embodiments, the wireless electronic connection between the first door control module 110 and the second door control module 120 is short-range radio signals, such as Bluetooth technology. For example, the first door control module 110 may include an integrated computer, such as an embedded Linux computer, and an antenna, such as a 2.4 GHz Bluetooth antenna. The second door control module 120, which may be a fob, embedded wheelchair device, or smartphone app, among others, may transmit a signal which can be detected by the antenna of the first door control module 110, thereby wireless electronically connecting the two modules 110, 120 together (as used herein, the terms "Bluetooth network" or "Bluetooth Low Energy network" refers to the modules 110, 120 wirelessly interconnected via short-range radio signals). In various embodiments, the first door control module 110 may function as a beacon that emits a Bluetooth signal that is detected by corresponding antenna(s) of the second door control module 120. In various embodiments, a directional antenna may be used such that signals are emitted in desired directions, thus improving the precision of the system and improving the accuracy of the calculated/determined proximity of the user relative to the powered door. While various different wireless connection technologies may be utilized to electronically connect the two modules 110, 120, Bluetooth technology, especially Bluetooth "Low Energy" ("BLE") technology, may be especially useful in the system 100 disclosed herein. BLE is a personal area network that provides considerably reduced power consumption while maintaining similar communication range as standard Bluetooth. In various embodiments, the system may utilize an Ultra-Wide Band (UWB) signal and/or BLE technology for determining proximity of the user to the powered door.

Figure 4:
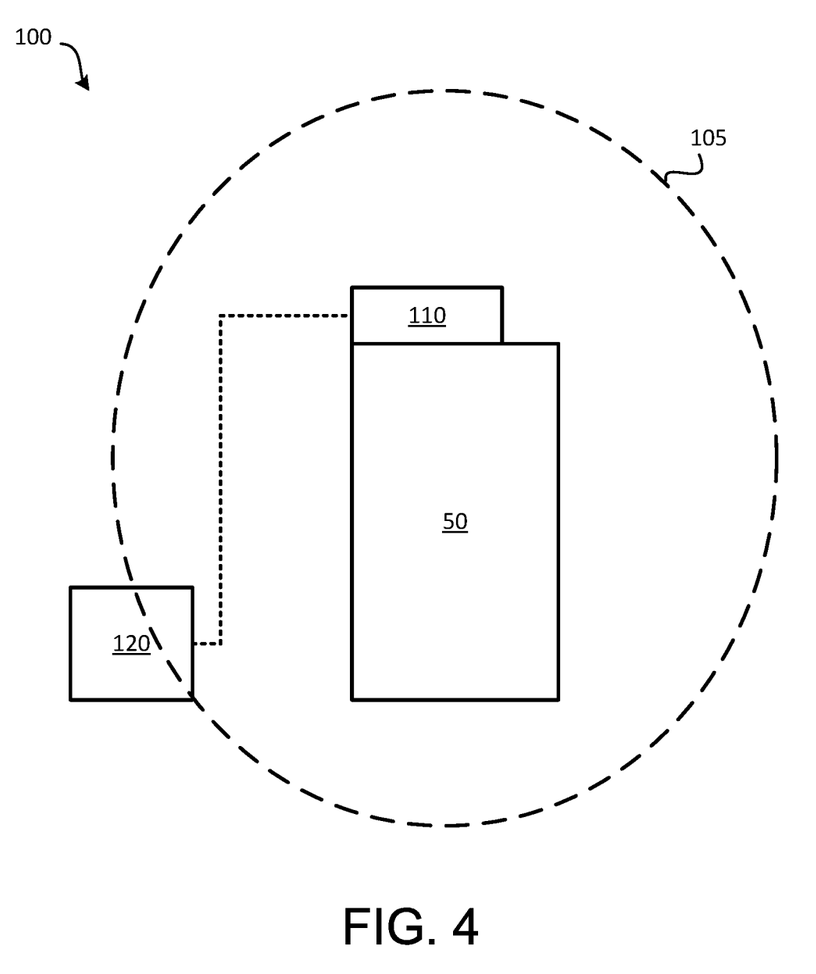
FIG. 4 is a schematic block diagram of an automated door system showing a wireless proximity region, in accordance with various embodiments.

In various embodiments, and with momentary reference to FIG. 4, the first door control module 110 may emit/define a wireless proximity region 105. The wireless proximity region 105 may represent a predetermined area around the powered door 50 that is used to determine when to actuate an opening actuation or a closing actuation of the powered door 50. That is, as described in greater detail below with reference to the method 590 of FIG. 5, wireless proximity region comprises a threshold distance from the powered door 50, and when the user (e.g., the second door control module 120) passes said threshold, the powered door 50 is actuated. Accordingly, in response to the second door control module 120 entering the wireless proximity region 105, the processor(s) of the system 100, such as the hardware processor of the first door control module 110, may cause the powered door 50 to open (e.g., may cause the door motor and corresponding actuation assembly to perform an opening actuation). As long as the user remains within the wireless proximity region 105, the powered door 50 may remain open. In response to the second door control module 120 exiting the wireless proximity region 105, the processor(s) of the system 100, such as the hardware processor of the first door control module 110, may cause the powered door 50 to close (e.g., may cause the door motor and corresponding actuation assembly to perform a closing actuation). In various embodiments, once a connection between the first and second door control modules 110, 120 is established, the modules 110, 120 will ascertain the distance, velocity, and direction of the user to determine if the user's intention is to access the door.

In various embodiments, determining whether the second door control module 120 is within or beyond the wireless proximity region is performed via a signal strength. That is, a measurement of the power present in a received radio signal may be used to determine a proximity of the user (e.g., the second door control module 120) relative to the powered door 50 (e.g., the first door control module 110). For example, the first door control module 110 may include code running on the processor/computer that not only validates that the second door control module is a registered/activated/approved user, but a signal strength analysis may be performed to determine the proximity of the user, thereby enabling the system 100 to open the powered door 50 as the user is approaching the powered door 50.

In various embodiments, the system is configured to perform various calibrations to improve the accuracy of the signal strength analysis for determining the proximity of the user to the powered door. The calibrations may be performed using the first door control module 110 and/or the second door control module 120. In various embodiments, the calibrations may be performed based on user data. For example, the system may determine if the user is generally pausing/waiting before entering powered doors, which may be an indication that powered doors are not opening sufficiently by the time the user arrives at the entry, and thus the system may adjust the proximity settings so that the powered doors initiate opening sooner or open faster, etc. Accordingly, the automated door opening may be customized for specific users based on the speed of their gate, the type of phone they have (e.g., signal strength, antenna considerations), etc. In various embodiments, these user specific calibrations may be input manually via the second door control module 120 (e.g., via an application on the portable electronic device of a user) such that the user can enter feedback regarding operation of the powered door, and the manually entered feedback can be used in the calibration.

Figure 2:
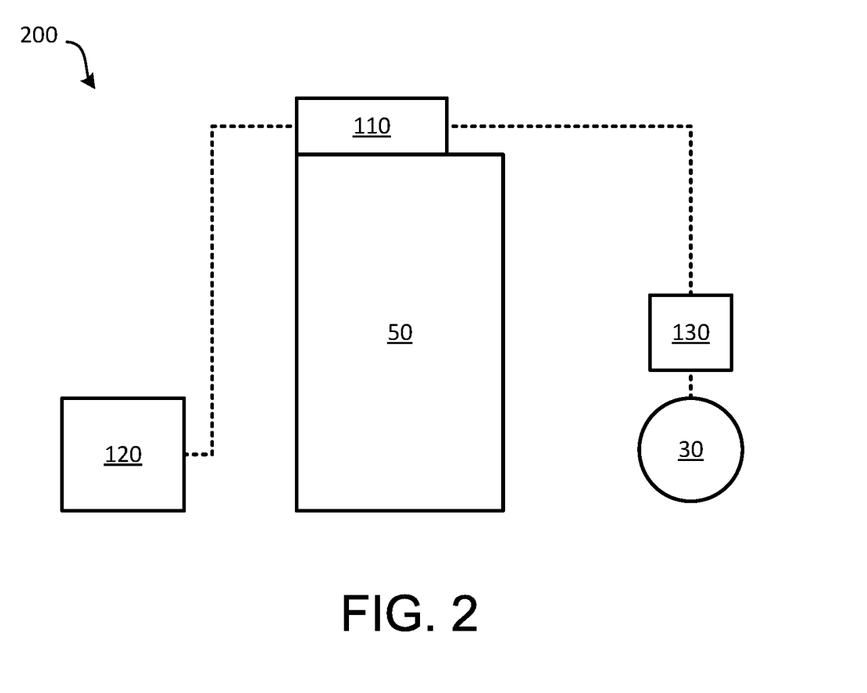
FIG. 2 is a schematic block diagram of an automated door system with a first door control module, a second door control module, and a third door control module, in accordance with various embodiments.

In various embodiments, and with reference to FIG. 2, the automated door system 200 may further include a third door control module 130. The third door control module 130 may be mounted in a fixed position relative to the powered door 50, similar to the first door control module 110, and the third door control module 130 may be coupled in electronic communication to a button 30 that is depressible for manual control of opening/closing of the powered door 50. That is, the third door control module 130 may be coupled to an existing button 30 (or may integrated/embedded into a button) and may be configured to be in wireless electronic communication with one or both of the other door control modules 110, 120. In such embodiments, the system 200 is configured to work with a conventional handicap door button will still work as normal with the support circuitry. In various embodiments, the second door control module 120 (e.g., the portable, user device) may interface directly with the third door control module 130, which may in turn communicate with the powered door 50 via the first door control module 110.

Figure 3:
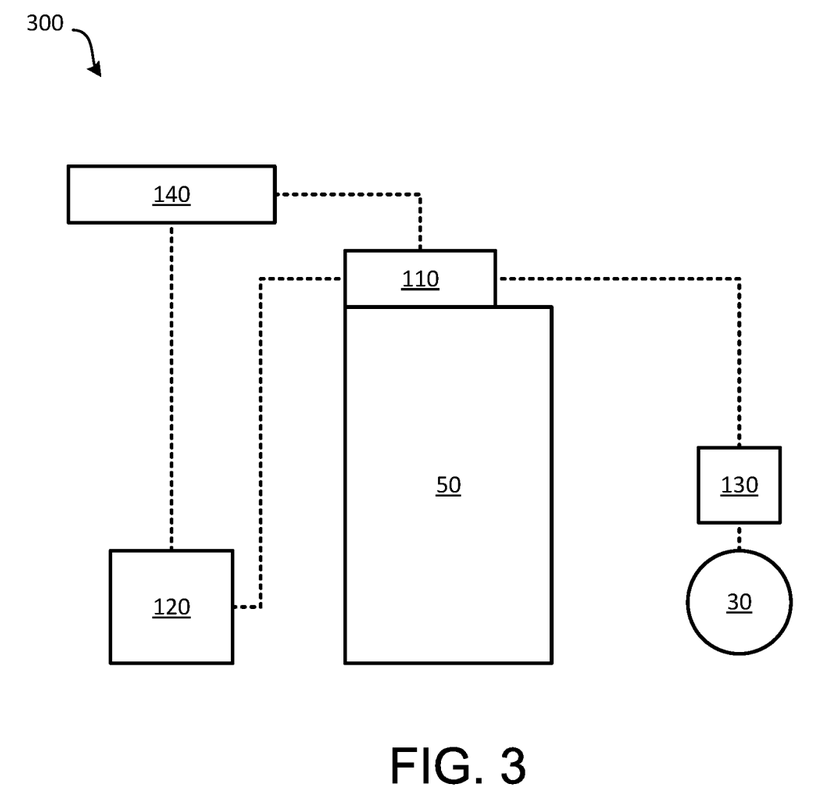
FIG. 3 is a schematic block diagram of an automated door system with a first door control module, a second door control module, a third door control module, and a server 140, in accordance with various embodiments.

In various embodiments, and with reference to FIG. 3, the automated door system 300 may further include a server 140 (e.g., may be in electronic communication with the cloud). In various embodiments, the server 140 may be coupled in wireless electronic communication via a the server 140 via a mobile broadband network. The mobile broadband network may be established via an antenna of the first door control module 110, and/or the mobile broadband network may be established via a data/cellular connection of a portable electronic device of the user. Accordingly, the various modules 110, 120, 130 may interface with each other via a short-range network, such as a Bluetooth Low Energy network, and the modules 110, 120, 130 may interface with the server 140 via a mobile broadband network of at least one of the modules 110, 120, 130.

Data indicative of and pertaining to the status, condition, and/or general operation of the powered door 50 may be transmitted to the server 140 to be stored, analyzed, and/or further utilized. For example, information pertaining to the number of door openings at a specific door or at a specific property, door openings per user, time a door is open vs time door is closed, etc., may be collected by the system 300 and transmitted to the server 140. In various embodiments, such data may be stored locally on the tangible, non-transitory memories of the various modules 110, 120, 130 and may be used to perform imminent calculations and to make urgent determinations, such as when to open and close the powered door 50. This collected data stored on the server may be useful to owners, manufacturers, installers, and/or service providers, as they may proactively maintain their automated door entryways. For example, the system 300 may be able to send diagnostic information to those involved in the handicap door maintenance.

Diagnostics may include a building-wide/facility wide map of the locations of power/assisted doors, battery life of the button, speed and force of doors, counters for a door's usage, malfunctioning motors, malfunctioning buttons, malfunctioning transmitters, location heat map of door foot traffic, etc. This collected information (e.g., the diagnostic information) may be transmitted to interested and involved persons via email, text, app notification, and work orders (if needed) can be sent to maintenance personnel. The diagnostics information can be sent immediately to the cloud service or can be saved locally to the device and be sent at set intervals of 30 min, 1 hour, 24 hours, etc. In various embodiments, diagnostic data is collected from user input via the second door control module 120. That is, a user may provide feedback pertaining to the operation of the powered door 50 and/or other feedback pertaining to the entry way (e.g., the presence of ice or other potentially unsafe conditions), or general feedback pertaining to the property/facility.

Figure 5:
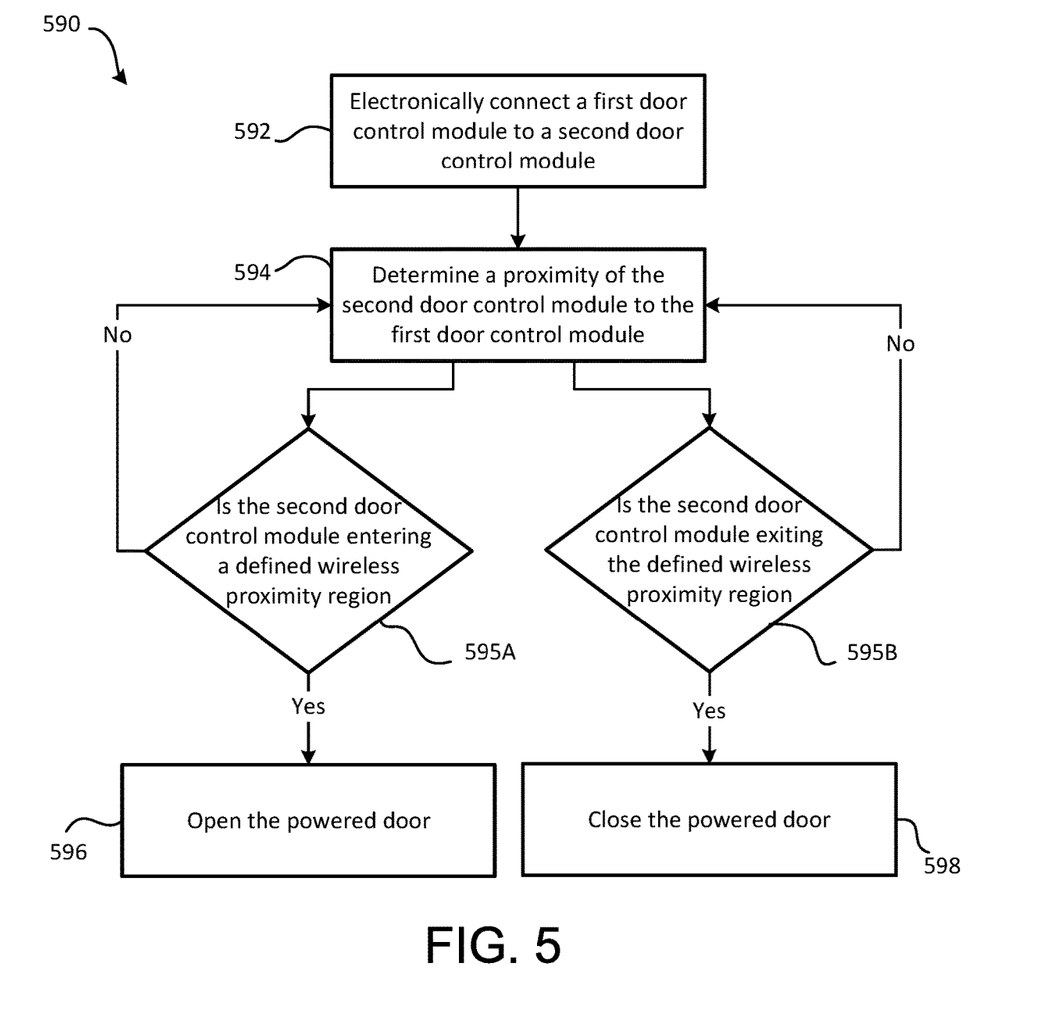
FIG. 5 is a schematic flow chart diagram of a method of controlling a powered door, in accordance with various embodiments.

In various embodiments, and with reference to FIG. 5, a method 590 of controlling a powered door 50 is provided. The method 590 includes electronically connecting a first door control module to a second door control module at step 592 and determining a proximity of the second door control module to the first door control module at step 594, according to various embodiments. The connection formed during step 592 may be a wireless connection, such as via BLE. As mentioned above, the first door control module may include hardware and processor(s) fixed relative to the powered door and the second door control module may include a portable device, such as a portable electronic device (e.g., smartphone) of a user with an application stored thereon. Steps 592 and 594 may be performed by the one or more processor(s) of the modules of the system. Step 594 may include performing signal-strength analyses to determine the proximity, as described in greater detail below.

In various embodiments, the proximity of the second door control module determined during step 594 may be used to determine further operations of the system. That is, as shown in decision block 595A of the schematic depiction of the method 590 in FIG. 5, if the second door control module is entering a defined wireless proximity region, the processor actuates the powered door to open the powered door at step 596 as the user is advancing towards it. Also as shown in FIG. 5, decision block 595B of the schematic depiction shows how, if the second door control module is exiting the defined wireless proximity region, the processor actuates the powered door to close the powered door at step 598 after the user has passed through the door and is moving away from it.

In various embodiments, the method 590 may further include determining, by at least one of the portable electronic device and the processor, a position, an orientation, and/or a location of the portable electronic device relative to the user. This information may be detected/determined by receiving sensed information form an accelerometer, magnetometer, and/or a light sensor, among other sensors, of the portable electronic device. The information received from these sensors may be useful in determining the position, orientation, and/or location of the portable electronic device, which in turn may affect the signal-strength calculations that are performed to determine the proximity of the user to the powered door. That is, the location of the portable electronic device relative to the user as the user is approaching the door (e.g., whether the portable electronic device is in the user's hand, is in the user's pocket, or is in the user's bag, etc.) may affect the signal-strength analysis of step 594. Accordingly, the detected information pertaining to the position, orientation, location of the portable electronic device, as well as the manufacturer/model and/or type of portable electronic device, may help calibrate operation of the system, as mentioned above, and may help the system to improve/optimize the opening actuation and the closing actuation.

In various embodiments, the method 590 may include providing, by at least one of the first door control module 110 and the second door control module 120 (e.g., by at least one of the portable electronic device and the processor), an audible indicator, a visible indicator, and/or a haptic indicator to the user pertaining to the status of the powered door. That is, the method 590 may include providing sensory feedback to the user to indicate whether or not the door is open or closed. For example, the method 590 may include providing audible feedback to a blind user that the door is open to facilitate and guide the blind user's entry through the door. In various embodiments, the method 590 may further include receiving, by the processor, feedback from the user via the application on the portable electronic device of the second door control module, wherein the user feedback pertains to a status/condition of the door and/or a status of the property/facility, etc.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching may be used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An automated door system comprising:
    a first door control module configured to be mounted in a fixed position relative to a powered door; and
    a second door control module configured to be carried by a user and configured to be in electronic communication with the first door control module to control at least one of an opening actuation and a closing actuation of the powered door, wherein at least one of the opening actuation and the closing actuation is based on at least one of a position of the second door control module relative to the user, an orientation of the second door control module relative to the user, and a location of the second door control module relative to the user.

2. The automated door system of claim 1, wherein the first door control module is configured to be wirelessly connected to the second door control module via at least one of Bluetooth Low Energy signal and an Ultra-Wide Band signal.

3. The automated door system of claim 1, wherein the first door control module comprises hardware configured to be coupled to a motor of the powered door.

4. The automated door system of claim 3, wherein the hardware is a beacon such that the hardware emits at least one of a Bluetooth Low Energy signal and an Ultra-Wide Band signal.

5. The automated door system of claim 3, wherein the hardware of the first door control module comprises a processor, wherein a tangible, non-transitory memory is configured to communicate with the processor, the tangible, non-transitory memory having instructions stored thereon that, in response to execution by the processor, cause the automated door system to perform at least one of the opening actuation and the closing actuation of the powered door.

6. The automated door system of claim 5, wherein the second door control module comprises an application stored on a portable electronic device of the user, wherein the application comprises at least a portion of the instructions.

7. The automated door system of claim 6, wherein:
    the instructions are configured to define a wireless proximity region relative to the powered door;
    in response to the second door control module entering the wireless proximity region, the processor causes the powered door to perform the opening actuation; and
    in response to the second door control module exiting the wireless proximity region, the processor causes the powered door to perform the closing actuation.

8. The automated door system of claim 7, wherein the instructions comprise calibrating at least one of the opening actuation and the closing actuation based on at least one of a type of the portable electronic device, a model of the portable electronic device, and a manufacturer of the portable electronic device.

9. The automated door system of claim 8, wherein:
    the first door control module is configured to be wirelessly connected to the second door control module via a Bluetooth Low Energy network; and
    the second door control module is configured to be wirelessly connected to the server via the mobile broadband network.

10. The automated door system of claim 3, wherein the hardware comprises a directional antenna.

11. An automated door system comprising:
    a first door control module comprising hardware mounted to a motor of a powered door, wherein the hardware of the first door control module comprises a processor, wherein a tangible, non-transitory memory is configured to communicate with the processor, wherein instructions are stored on the tangible, non-transitory memory; and
    a second door control module comprising an application stored on a portable electronic device of a user, wherein the second door control module is configured to be in electronic communication with the first door control module via a short-range radio network in response to the portable electronic device being within a wireless proximity region, wherein the application comprises at least a portion of the instructions, wherein the instructions cause the automated door system to perform, by the processor, at least one of an opening actuation and a closing actuation of the powered door;
    wherein instructions cause the automated door system to calibrate at least one of the opening actuation and the closing actuation based on at least one of a position of the portable electronic device relative to the user, an orientation of the portable electronic device relative to the user, a location of the portable electronic device relative to the user, a type of the portable electronic device, a model of the portable electronic device, and a manufacturer of the portable electronic device.

12. The automated door system of claim 11, further comprising a third door control module mounted in a fixed position relative to the powered door, wherein the third door control module is coupled to a button that is depressible for manual control of at least one of the opening actuation and the closing actuation.

13. The automated door system of claim 12, wherein the third door control module is in electronic communication with the first door control module via the short-range radio network.

14. The automated door system of claim 13, wherein the wireless proximity region is defined by at least one of the hardware of the first door control module and the third door control module.

15. A method of controlling a powered door, the method comprising:
    wirelessly electronically connecting, by a processor of a first door control module that is mounted in a fixed position relative to the powered door, a second door control module to the first door control module, wherein the second door control module comprises an application stored on a portable electronic device of a user;
    determining, by the processor, a proximity of the second door control module to the first door control module;
    in response to determining that the second door control module is entering a defined wireless proximity region relative to the powered door, actuating, by the processor, the powered door to open the powered door;
    in response to determining that the second door control module is exiting the defined wireless proximity region relative to the powered door, actuating, by the processor, the powered door to close the powered door; and determining, by at least one of the portable electronic device and the processor, at least one of a position, an orientation, and a location of the portable electronic device relative to the user.

16. The method of claim 15, wherein determining the proximity of the second door control module to the first door control module comprises determining at least one of a type, a model, and a manufacturer of the portable electronic device.

17. The method of claim 15, wherein determining at least one of the position, the orientation, and the location of the portable electronic device relative to the user comprises receiving sensed information from at least one of an accelerometer, magnetometer, and light sensor of the portable electronic device.

18. The method of claim 15, further comprising providing, by at least one of the portable electronic device and the processor, at least one of an audible indicator, a visible indicator, and a haptic indicator to the user pertaining to a status of the powered door.

19. The method of claim 15, further comprising receiving, by the processor, feedback from the user via the application of the second door control module pertaining to at least one of a door status and a door condition of the powered door.

20. The method of claim 15, further comprising transmitting, by the processor, data pertaining to operation of the powered door to a server.

* * * * *